United States Patent [19]
Connolly et al.

[11] Patent Number: 5,651,391
[45] Date of Patent: Jul. 29, 1997

[54] THREE-WAY SOLENOID VALVE

[75] Inventors: John Connolly, Rock Falls; Terry Forbes, Dixon; Dan Stoddard, Amboy, all of Ill.

[73] Assignee: Borg-Warner Automotive, Inc., Sterling Heights, Mich.

[21] Appl. No.: 643,371

[22] Filed: May 6, 1996

[51] Int. Cl.$^6$ .................................................. F15B 13/044
[52] U.S. Cl. ........................ 137/625.65; 137/454.6; 137/596.17; 137/884; 251/129.14
[58] Field of Search .................... 137/454.6, 546.17, 137/625.65, 884; 251/129.14

[56] References Cited

U.S. PATENT DOCUMENTS

| | | |
|---|---|---|
| 3,576,473 | 4/1971 | Genbauffe et al. . |
| 3,728,654 | 4/1973 | Tada . |
| 4,338,966 | 7/1982 | Smith ................................. 137/596.17 |
| 4,422,060 | 12/1983 | Matsumoto et al. . |
| 4,558,293 | 12/1985 | Haneda et al. . |
| 4,578,662 | 3/1986 | Slavin et al. ..................... 137/625.65 X |
| 4,609,965 | 9/1986 | Baker . |
| 4,678,006 | 7/1987 | Northman et al. ................. 137/596.17 |
| 4,893,652 | 1/1990 | Nogle et al. . |
| 4,966,195 | 10/1990 | McCabe ............................. 137/625.61 |
| 4,994,776 | 2/1991 | Juncu . |
| 5,044,338 | 9/1991 | Shelton .............................. 137/351 X |
| 5,121,018 | 6/1992 | Oldakowski . |
| 5,200,728 | 4/1993 | Patterson et al. . |
| 5,272,458 | 12/1993 | Hoffman et al. . |
| 5,470,043 | 11/1995 | Marts et al. . |

*Primary Examiner*—Gerald A. Michalsky
*Attorney, Agent, or Firm*—Brooks & Kushman; Greg Dziegielewski

[57] ABSTRACT

A solenoid-actuated valve assembly is provided with reduced noise. A rubber retainer and steel retainer secure the valve within a manifold, and the rubber retainer absorbs longitudinal vibrations. A plurality of rubber gaskets surround the body of the valve and prevent metal-to-metal contact between the valve body and the manifold for cushioning lateral vibrations of the valve. The valve is substantially submerged in transmission fluid for airborne noise abatement, and opposing ends of the valve body are provided in communication with a vent port for substantially pressure-balancing the valve body.

13 Claims, 9 Drawing Sheets

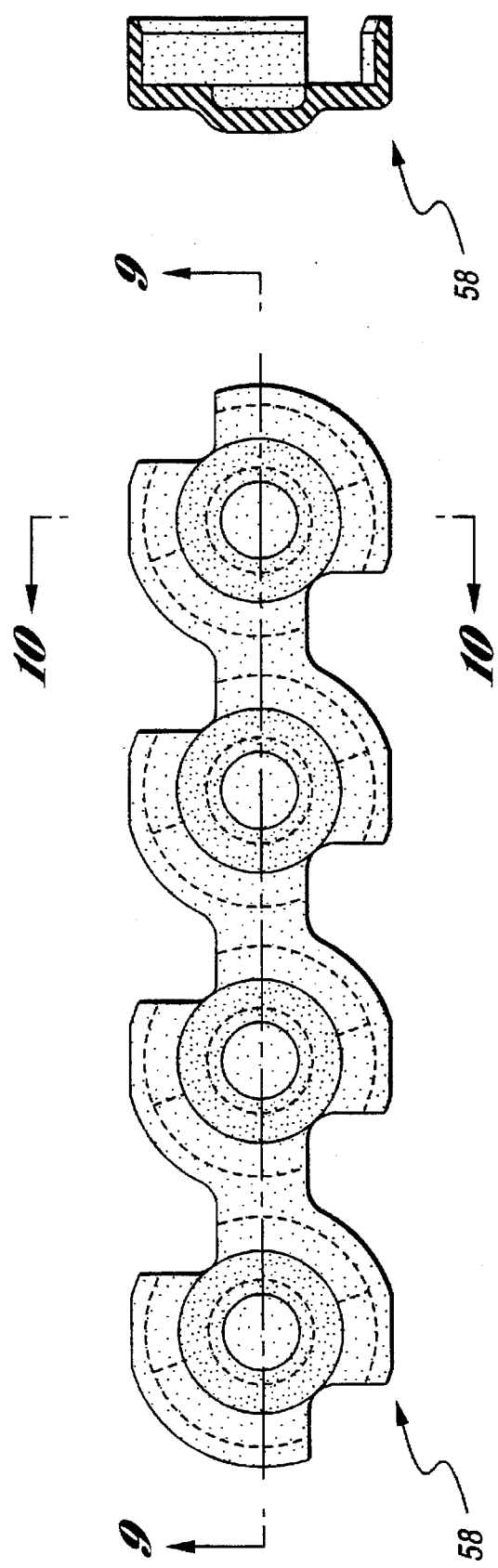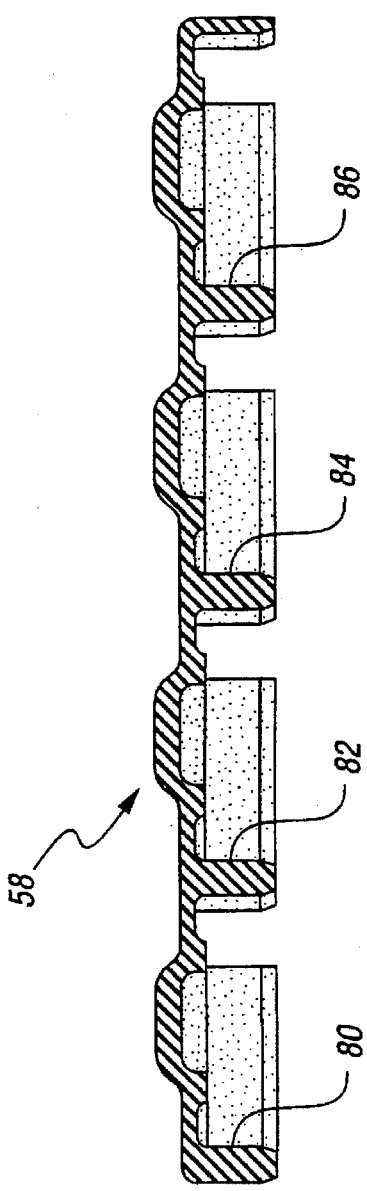
Fig. 10
Fig. 9
Fig. 8

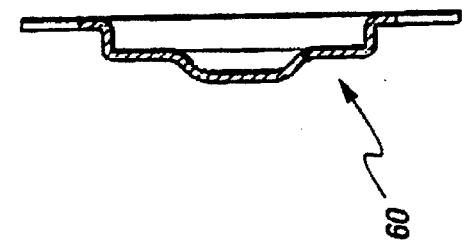
Fig. 12
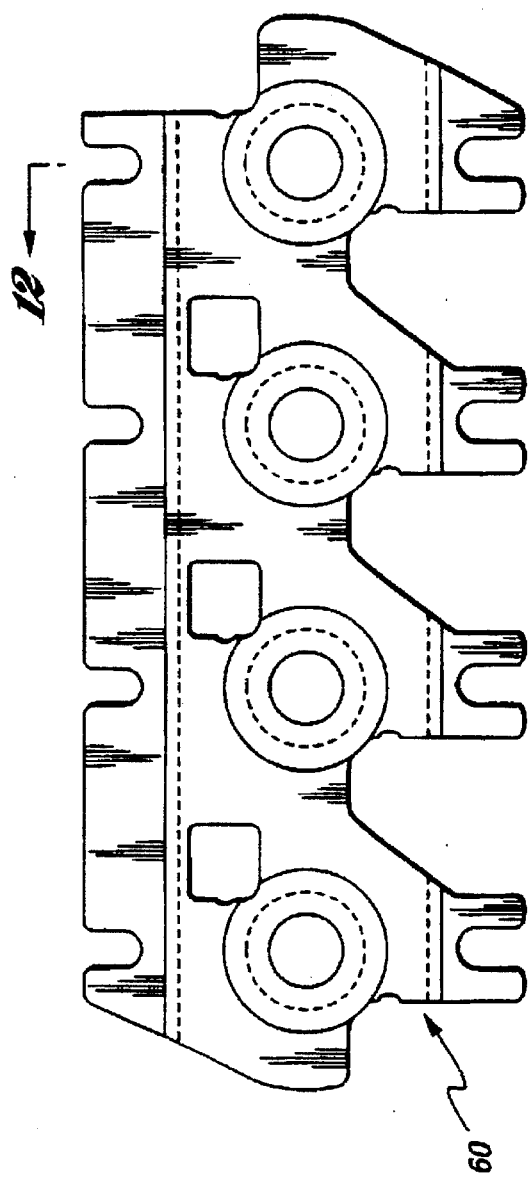
Fig. 11
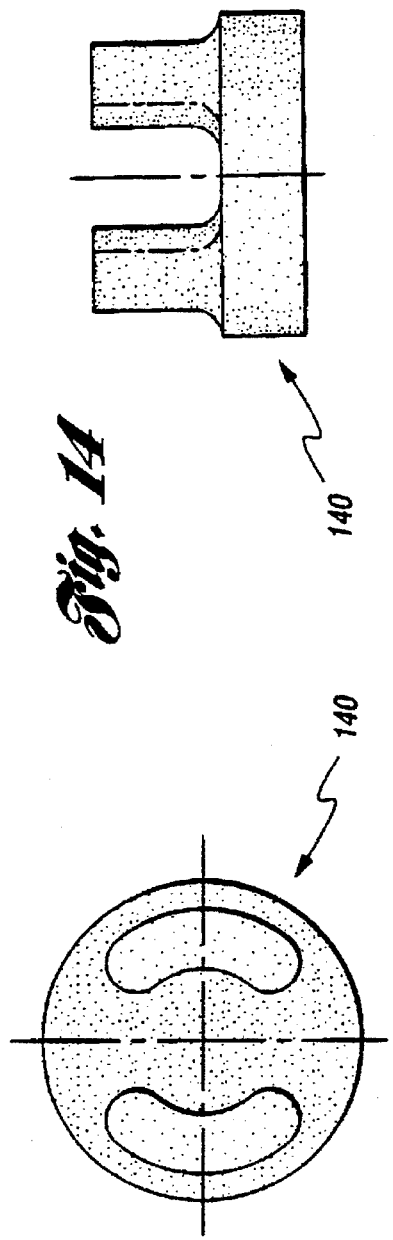
Fig. 14
Fig. 13

THREE-WAY SOLENOID VALVE

TECHNICAL FIELD

The present invention relates to a three-way valve for use in a vehicle, and more particularly to a solenoid-actuated three-way valve with reduced noise.

BACKGROUND OF THE INVENTION

The control system of an automatic transmission is typically hydraulically operated through the use of valves which direct and regulate the supply of pressure. This hydraulic pressure control causes either actuation or deactuation of frictional members for affecting gear changes in the transmission. Traditionally, such valves have comprised spring-biased spool valves, spring-biased accumulators, and ball check valves.

These spring-type valves prove problematic in certain areas, primarily because they were limited to use in a narrow range of engine designs. More recently, automatic transmission designs have included adaptive control systems which utilize electrically operated solenoid-actuated valves for controlling various fluid pressures.

However, current solenoid-actuated valve designs also have their shortcomings. For example, vibrationally-transmitted impact noise during shifting results in a chattering effect from solenoid actuation. This chattering is a result of the pulse width modulated (PWM) electronic drive signal which actuates the solenoids. This occurs under step shifting conditions in which the solenoid ramps from 0 to 100 percent duty cycle or vice versa. The vibrational energy generated is at the excitation PWM frequency, as well as the higher order multiple of the drive frequency. This vibrational energy directly transmits from the solenoid through its mounting interface into the transmission housing.

Another problem with current designs is airborne noise from valve actuation. Certain current designs include an elastomeric sound shield mounted over the module when installed on the vehicle transmission. In order to retain the sound shield over the module, a spacer plate along with an extra gasket are required. These added components increase cost to the customer in both material and labor, while providing an added external leak path. Furthermore, the sound shield is not particularly effective in airborne noise abatement.

Another problem inherent with current designs is that all solenoid components must be completely assembled prior to testing. Because of this, it is difficult to use "poka-yoke" techniques in sub-assemblies upstream to prevent problems from occurring downstream, which are typically detected only when the module is fully assembled. At this point, it is common to disassemble and rework a significant number of solenoid modules due to problems which could have been detected prior to assembly completion.

A further problem experienced with current designs is particulate sensitivity. The transmission fluid circulating about the valve includes particulate matter which tends to attract to the armature and pole piece, particularly ferrous particles. This build-up of particulate matter can become great enough to diminish the effectiveness of the armature or to completely disable the valve, which results in a default condition.

SUMMARY OF THE INVENTION

The present invention overcomes the above-referenced shortcomings of prior art solenoid-actuated valves by providing a solenoid-actuated three-way valve which is vibrationally isolated from the manifold by a rubber retainer and a series of gaskets, as well as being substantially submerged in transmission fluid for airborne noise abatement. The present invention further includes a non-magnetic sleeve disposed within the solenoid and substantially surrounding the armature to prevent migration of particulate matter to the armature. Additionally, the valve is designed to allow testing prior to complete assembly of the module.

More specifically, the present invention provides a solenoid-actuated valve assembly with reduced noise. The assembly comprises a manifold having first, second, third and fourth stepped bores formed therein with a longitudinally extending solenoid-actuated valve disposed within the stepped bores. A support bracket is secured to the manifold adjacent the first stepped bore, and a rubber retainer is disposed between the support bracket and valve for cushioning longitudinal vibrations of the valve for noise reduction. First, second and third rubber gaskets are disposed about the valve and cushion the valve with respect to the second, third and fourth bores, respectively, for cushioning lateral vibrations of the valve for noise reduction.

In a preferred embodiment, the manifold further comprises a cavity formed in fluid communication with the bores, the cavity being filled with transmission fluid for substantially submerging the valve for airborne noise abatement.

In a further preferred embodiment, a substantially cylindrical non-magnetic sleeve is disposed within the solenoid and substantially surrounds the armature to prevent build-up of debris on the armature.

Accordingly, an object of the present invention is to provide an improved solenoid-actuated three-way valve assembly with reduced noise.

A further object of the present invention is to provide an improved solenoid-actuated three-way valve assembly in which the valve is fully vibrationally isolated from the manifold by a rubber retainer on one end of the valve, and a series of rubber gaskets disposed about the valve body.

Another object of the present invention is to provide an improved solenoid-actuated three-way valve assembly in which the valve is substantially submerged in transmission fluid for airborne noise abatement.

Yet another object of the present invention is to provide a solenoid-actuated three-way valve assembly in which particulate matter is shielded from the armature in order to prevent build-up of such matter on the armature.

A further object of the present invention is to provide a solenoid-actuated valve assembly in which the valve may be operationally tested prior to complete assembly of the module.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 8 shows a plan view of an elastomeric retainer in accordance with the present invention, as shown in FIG. 1;

FIG. 9 shows a vertical cross-sectional view of the elastomeric retainer shown in FIG. 8 taken at line 9—9;

FIG. 10 shows a sectional view of the elastomeric retainer of FIG. 8 taken at line 10—10;

FIG. 11 shows a plan view of a steel retainer plate in accordance with the present invention, as shown in FIG. 2;

FIG. 12 shows a vertical cross-sectional view of the retainer plate of FIG. 11, taken along line 12—12 of FIG. 11;

FIG. 13 shows a plan view of a seat retainer for use with the present invention; and FIG. 14 shows a side view of the seat retainer shown in FIG. 13.

DETAILED DESCRIPTION OF THE PREFERRED EMBODIMENTS

Figure 1:
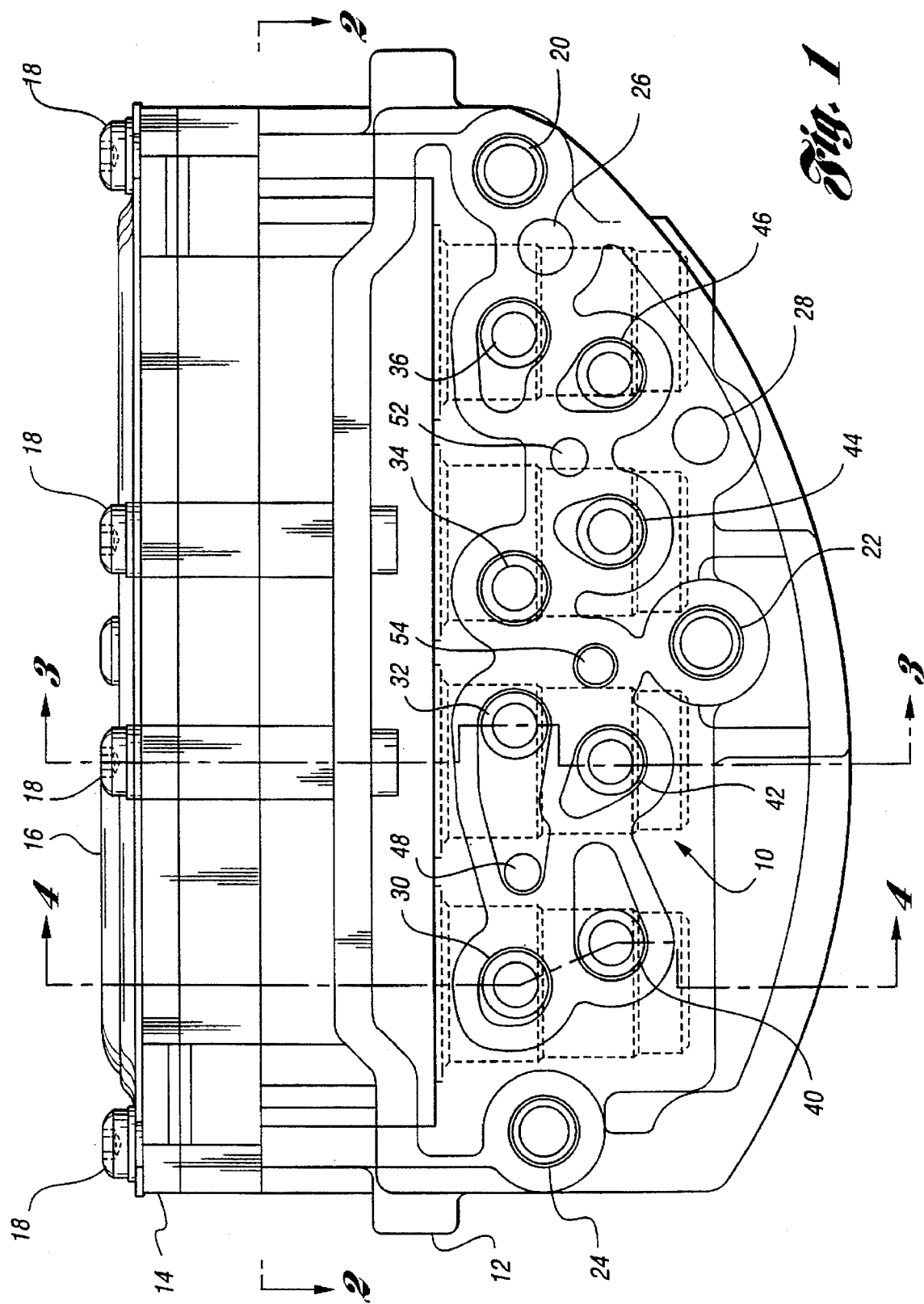
FIG. 1 shows a plan view of a transmission manifold with a plurality of valves disposed therein in accordance with the present invention.
Figure 2:
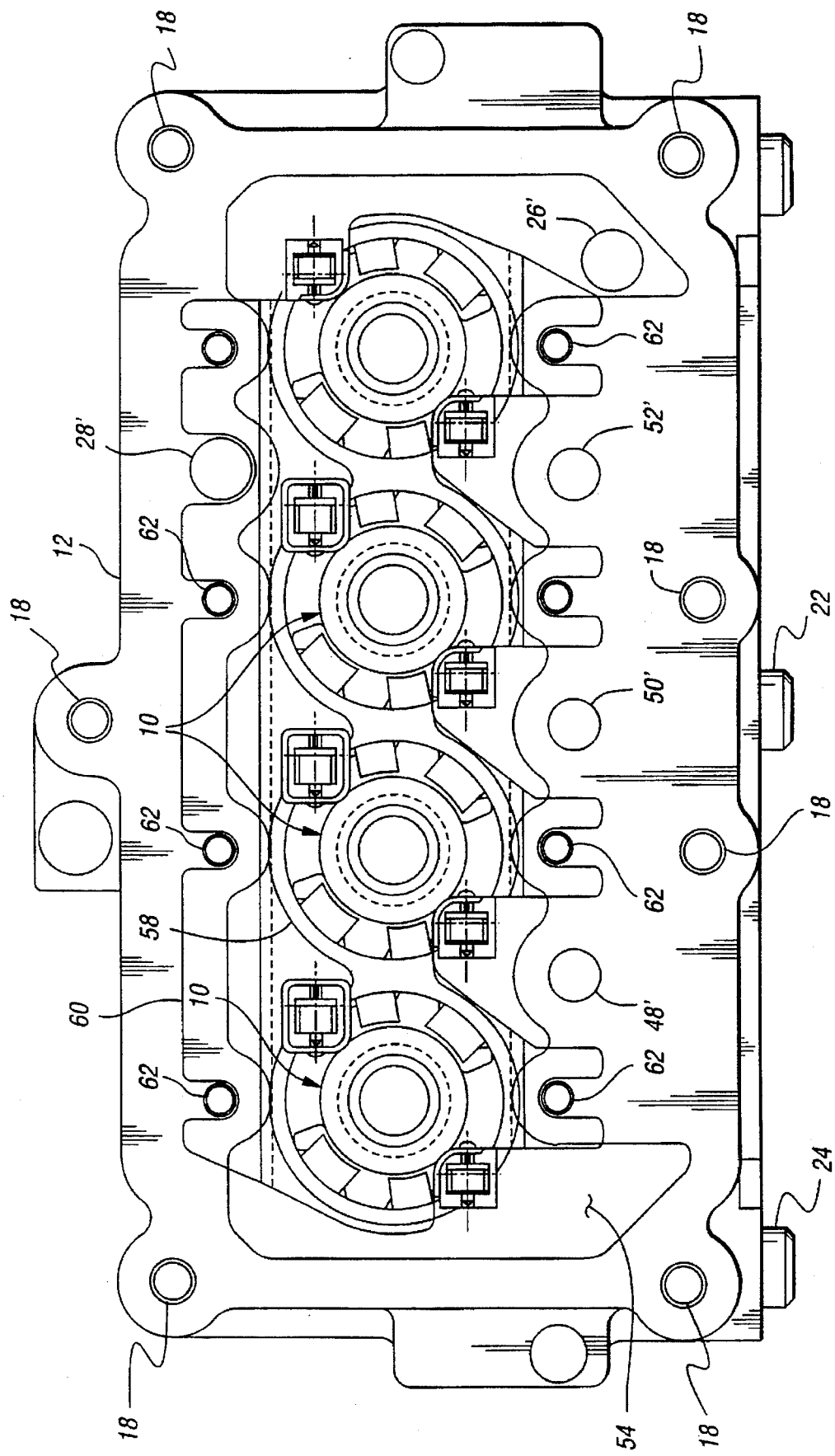
FIG. 2 shows a horizontal cross-sectional view of the transmission assembly shown in FIG. 1 taken at line 2—2.

FIG. 1 shows an environmental view of a solenoid-actuated three-way valve 10 disposed within a transmission manifold 12 in accordance with the present invention, and FIG. 2 shows a cross-sectional view taken at line 2—2 of FIG. 1. The manifold 12 includes an insulator 14 with a cover plate 16 secured thereon by cover screws 18. The manifold further includes location dowels 20, 22 and 24, as well as a clutch return port 26, solenoid bowl drain port 28, as well as element ports 30, 32, 34, 36 and supply ports 40, 42, 44, 46. Additionally, pressure switch ports 48, 50, 52 are provided on the manifold 12.

FIG. 2 shows the valve assemblies 10 disposed within the manifold 12. The manifold 12 includes a relief cavity 54 which surrounds all of the solenoid valves 10. Within this relief cavity 54, transmission fluid submerges each solenoid valve 10 up to a level where port hole 28' drains the fluid from the relief cavity 54 back to the transmission sump (not shown). By at least partially submerging each valve assembly 10 in transmission fluid, airborne noise abatement is accomplished.

Further shown in FIG. 2 is the rubber retainer 58 (also shown in FIGS. 8–10) which shrouds all of the solenoids 10. A steel back-up retainer 60 (also shown in FIGS. 11 and 12) supports the rubber retainer 58 and aids in centering the solenoids 10 and rubber retainer 58. Screw holes 62 receive screws for fastening the steel back-up retainer 60 to the manifold 12 for maintaining sturdy support for the rubber retainer 58.

Figure 3:
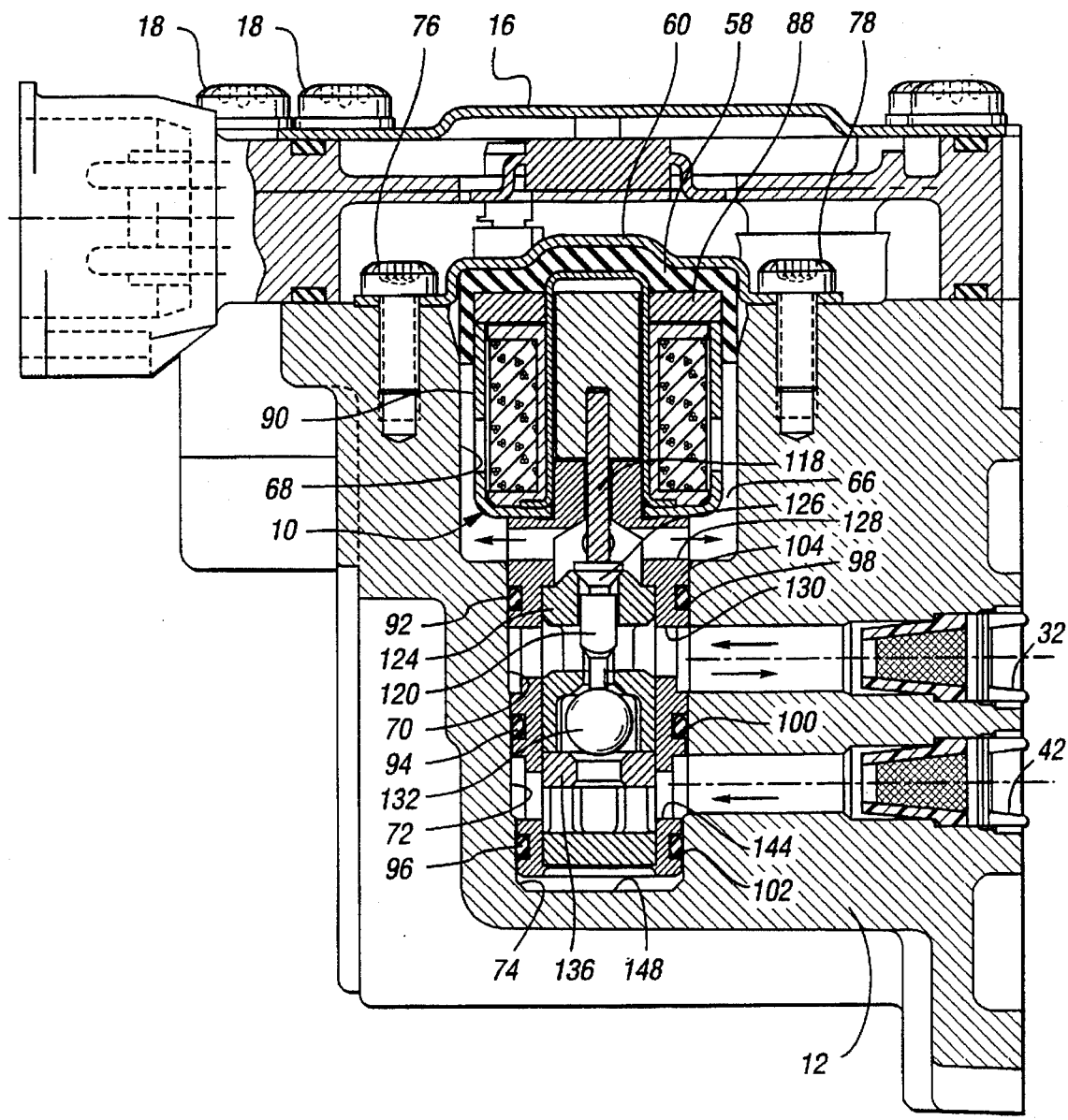
FIG. 3 shows a vertical cross-sectional view of the transmission assembly of FIG. 1 taken at line 3—3.

Turning to FIG. 3, a vertical cross-section taken at line 3—3 of FIG. 1 is shown. The valve shown in this embodiment is a normally vented-type solenoid. Functionally, in the normally deenergized mode, the element port 32 is communicating with the vent port 66 and relief cavity 54 through the three-way valve.

As shown in FIG. 3, the manifold 12 includes first, second, third and fourth bores 68, 70, 72, 74 for receiving the valve 10. The valve 10 is secured within the bores 68, 70, 72, 74 by the rubber retainer 58, which is secured by the back-up retainer 60 and screws 76, 78 to the manifold 12. The rubber retainer 58 includes a plurality of cup portions 80, 82, 84, 86, shown in FIG. 9. These cup portions 80, 82, 84, 86 engage the washer 88 and outer cover 90 of the valve 10 for centering and securing the valve 10 in position within the bores. The valve 10 further includes first, second and third rubber gaskets 92, 94, 96 disposed in slots 98, 100, 102 formed in the valve body 104. The rubber gaskets 92, 94, 96 cushion lateral vibrations of the valve 10 with respect to the manifold 12 by engaging the walls of the second, third and fourth bores 70, 72, 74. Not only do the rubber gaskets 92, 94, 96 prevent metal-to-metal contact of the valve body with the manifold 12, the rubber gaskets also function to seal off any undesired flow along the walls of the second, third and fourth bores 70, 72, 74.

Figure 5:
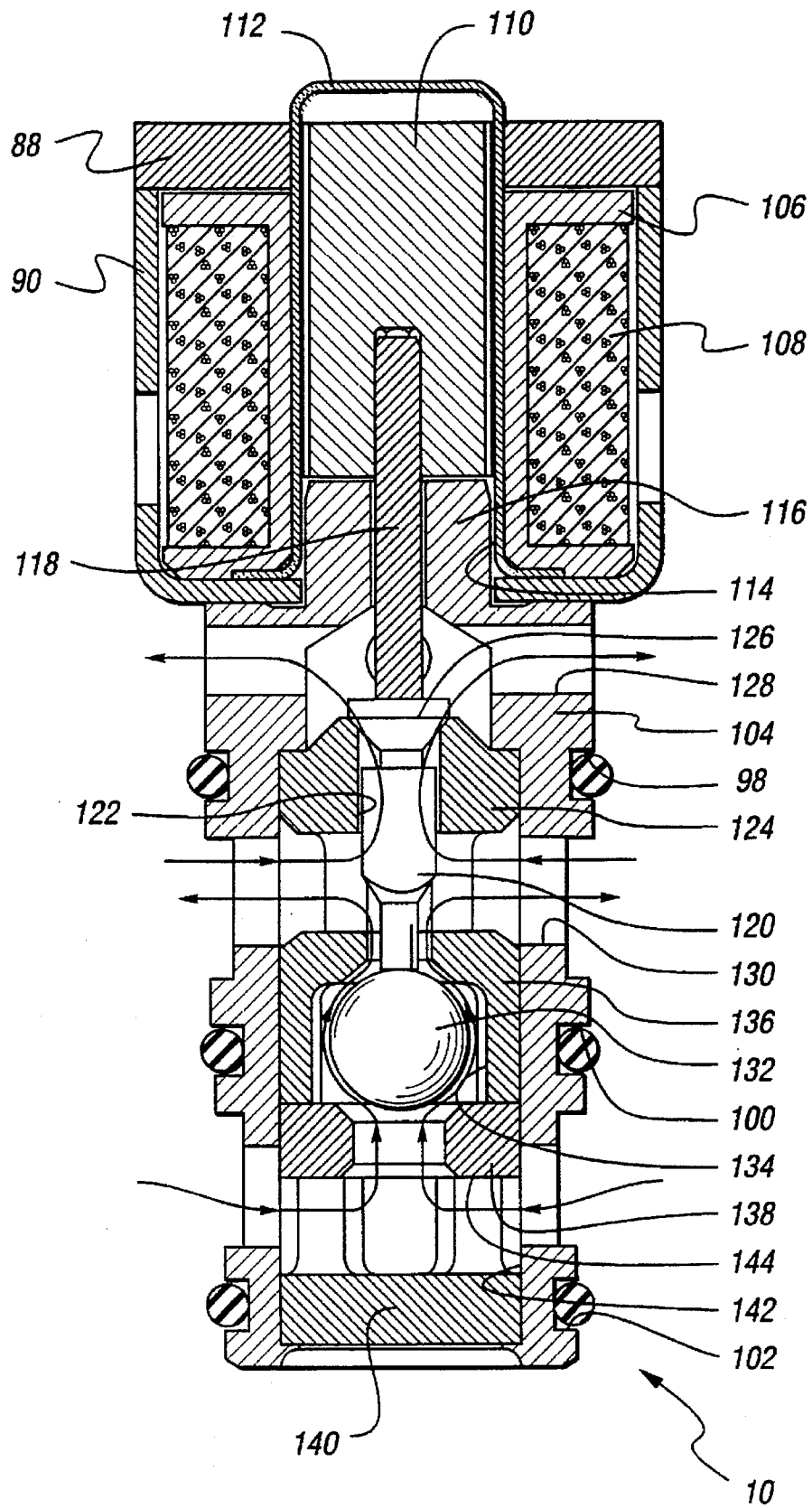
FIG. 5 shows an enlarged cross-sectional view of the solenoid valve as shown in FIG. 3.

The vented solenoid valve 10 is more clearly described with reference to FIG. 5. The valve includes a spool 106 disposed within the cover 90, and includes a solenoid coil 108 wrapped therearound. A movable armature 110 is disposed within the spool 106, and is actuated by the solenoid coil 108. A substantially cylindrical non-magnetic sleeve 112 surrounds the armature, and includes an open end 114 which receives the pole core 116. The pole core 116 is formed as part of the valve body 104. The sleeve 112 and pole piece 116 substantially enclose the armature 110 to prevent migration and build-up of debris on the armature. The valve 10 further includes a pin 118 which is secured to the armature 110 for movement therewith. The pin 118 is engageable with the plunger 120. The plunger 120 is movable within an aperture 122, which is formed in the upper seat 124. The plunger 120 includes a plunger seat 126 which is engageable with the upper seat 124 for selectively blocking fluid communication between the first lateral channel 128 and the second lateral channel 130.

The valve 10 further comprises a ball 132 disposed in an aperture 134 formed between the lower seat 136 and ball retainer 138. A seat retainer 140 is disposed at the lower end of the axial channel 142 of the body 104. The seat retainer 140 is press fit and staked into position to secure the assembly together. A third lateral channel 144 is formed between the ball retainer 138 and the seat retainer 140. The seat retainer is further illustrated in FIGS. 13 and 14.

Referring back to FIG. 3, the second lateral channel 130 is provided in fluid communication with the element port 32, and the third lateral channel 144 is provided in communication with the supply port 42. When the coil 108 is energized, the armature 110 moves the pin 118 toward the plunger 120, which engages the ball 132 to unseat the ball 132 from the lower seat 136, thus allowing fluid communication between the third lateral channel 144 and the second lateral channel 130. This downward movement of the pin 118 and plunger 120 further causes engagement of the plunger seat 126 with the upper seat 124 for selectively blocking fluid communication between the first lateral channel 128 and the second lateral channel 130.

Figure 6:
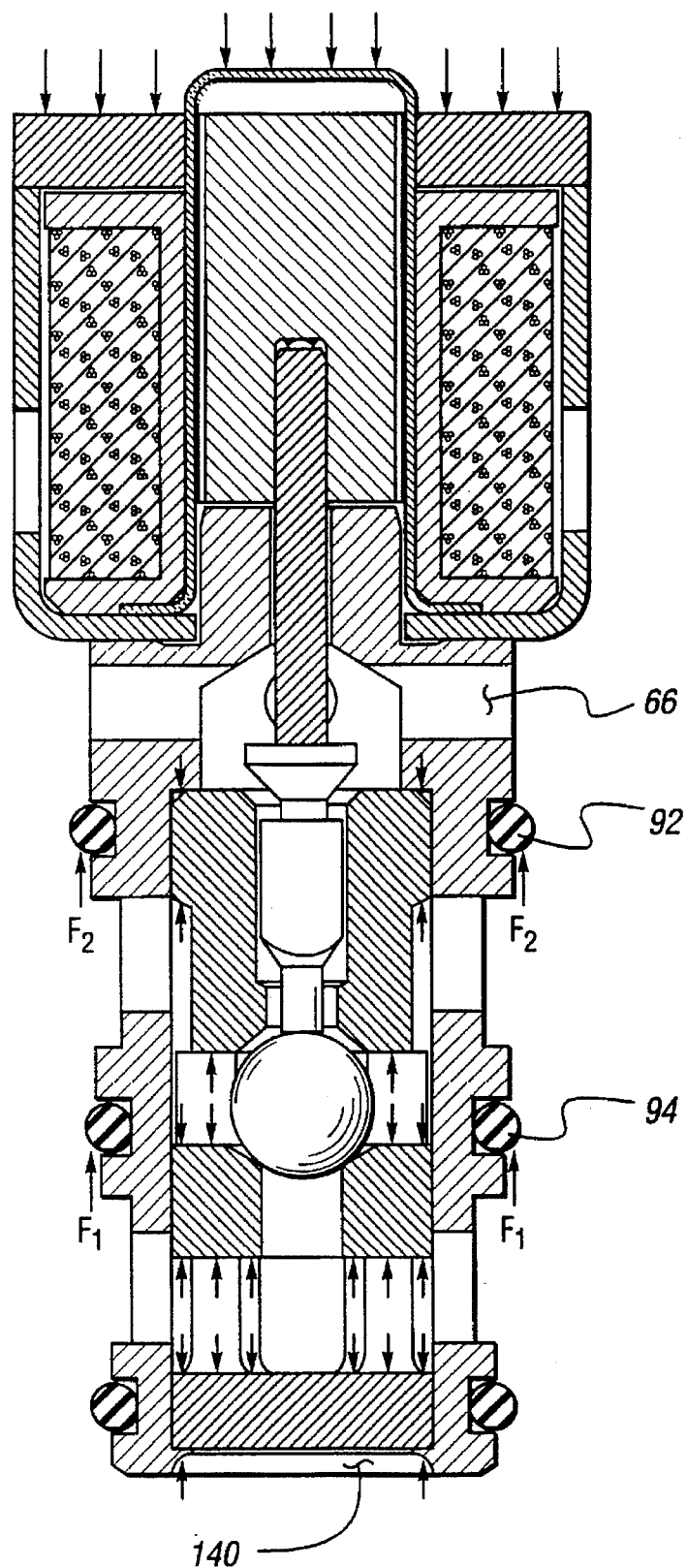
FIG. 6 shows a sectional view of an applied solenoid valve for use in accordance with the present invention as enlarged from FIG. 4.

A substantial pressure balance is provided on the valve body 104 by communicating the vent port 66 with the vent chamber 148 which is formed by cooperation between the manifold 12, seat retainer 140 and the lower end of the body 104. The substantial pressure balance is illustrated in FIG. 6, which shows an applied solenoid valve. With the vent port 66 in communication with the vent chamber 140, pressures acting on the valve body 104 are substantially pressure-balanced (as illustrated by the equal number of upward and downward force arrows acting on the body), except for the forces F1 and F2, shown in FIG. 6, which result from the stepwise enlargement of cross-sectional area of the valve body 104.

The two objectives of this design are to increase the amount of surface contact area of the rubber retainer relative to the solenoid washer for better load distribution, and to significantly reduce the loading reacting at the rubber. As shown in FIG. 6, the reaction area is across the entire end surface of the solenoid, including the sleeve end, which meets the first objective. The second objective is accomplished by providing both ends of the solenoid body at vent pressure, as described above, for a substantial pressure balance and a significant load reduction on the rubber retainer. Within the body, all forces cancel one another, and the reaction force of the upper seat to the body is countered with a reaction force of the seat retainer, which is pressed and staked to the body. Therefore, these internal body forces are negligible.

The effective forces are F1, which is the supply pressure acting on an annular area of the manifold bore and gasket 94, as well as F2, which is the element pressure acting on an annular area of the bore and gasket 92. All other annular forces cancel within the supply and element cavities. The worst case condition for reaction force against the rubber retainer is when both supply and element ports are at equal pressure, i.e., when the normally vented solenoid is energized or the normally applied solenoid is deenergized. Even in this worst case condition, the effective reaction force at the rubber retainer is reduced by 86% from the FIG. 7 concept, discussed below. The lower reaction forces at the rubber retainer prevent the rubber from excessive creep and therefore maintain good vibration isolation. Similarly, low stress on the rubber will increase its life.

Figure 4:
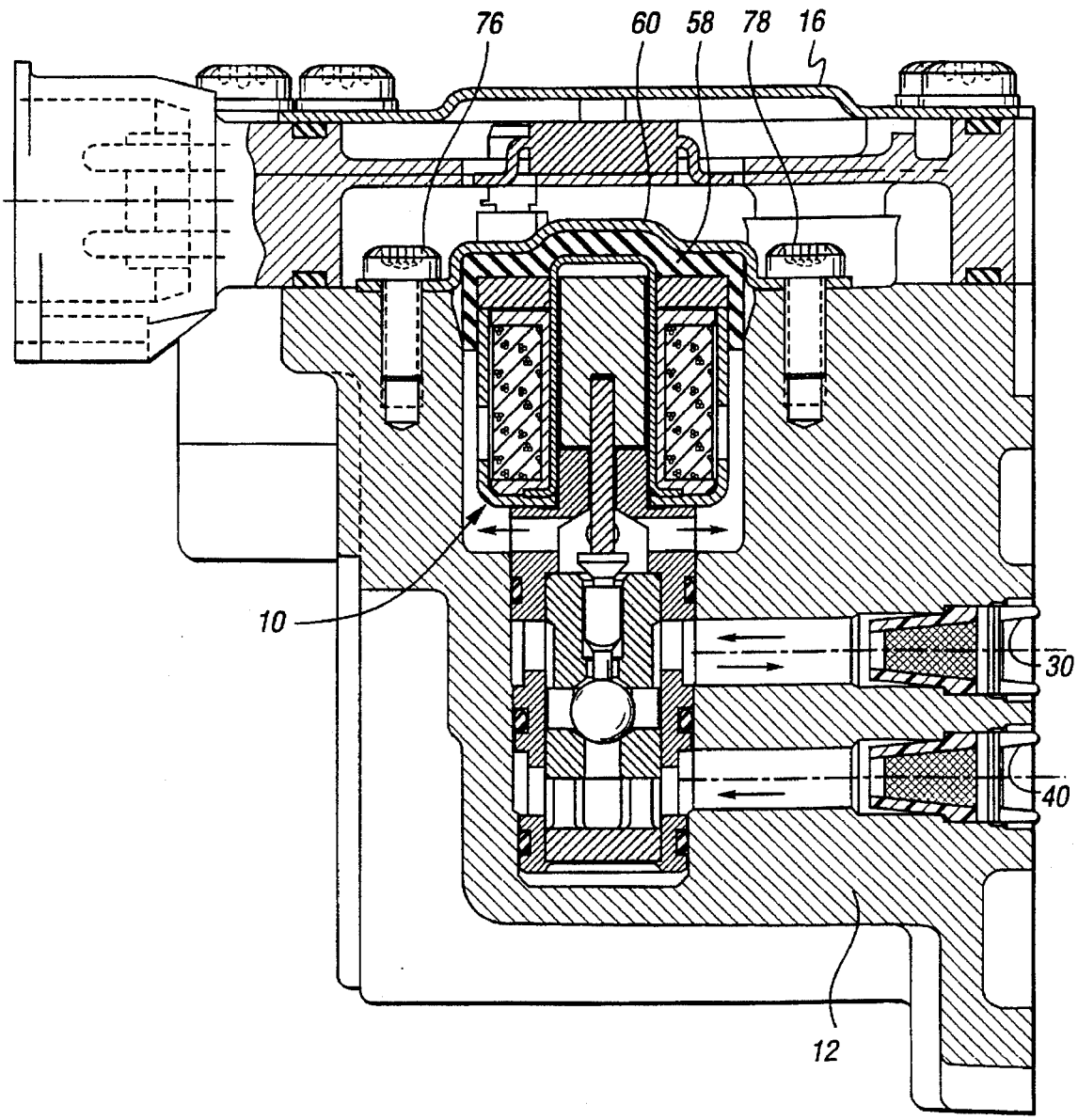
FIG. 4 shows a sectional view of the transmission assembly of FIG. 1 taken at line 4—4.

The embodiment illustrated in FIG. 4, as described previously, is similar in structure as the embodiment shown in FIG. 3, except that the valve illustrated in FIG. 4 is a normally applied-type valve. This embodiment corresponds with that shown in FIG. 6, which is previously described.

Figure 7:
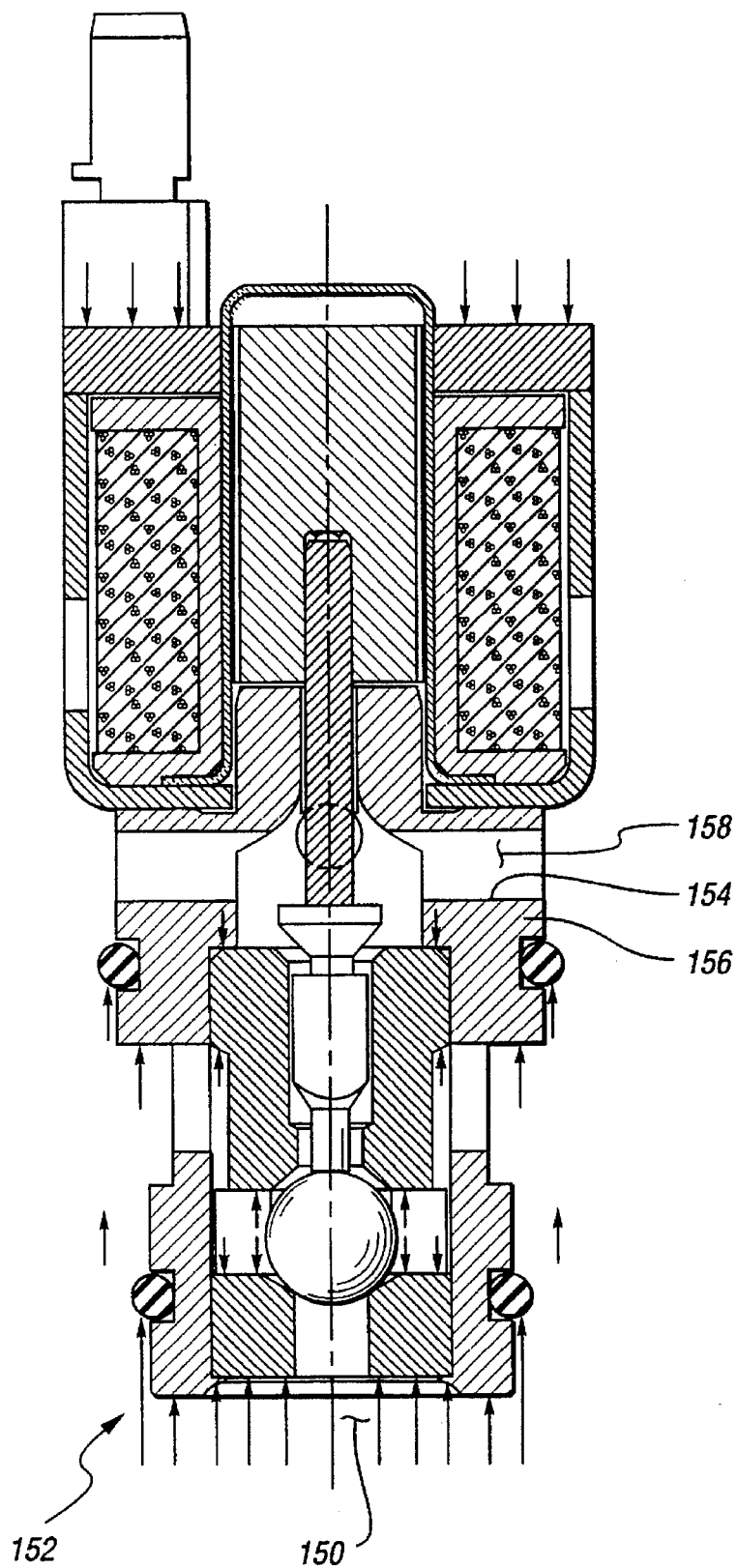
FIG. 7 shows a vertical cross-sectional view of an alternative applied solenoid valve design.

FIG. 7 shows a more conventional design concept which provides a port 150 at the bottom of the valve 152, the port 150 being in communication with the supply port, and therefore not pressure-balanced with the vent port 158, which communicates with the lateral channel 154 in the body 156. In this configuration, the valve body 156 is not pressure-balanced, and a significant upward force of the valve 152 must be reacted by the manifold. As a result, loading is approximately 86% greater on the rubber retainer using this configuration as opposed to that shown in FIGS. 3 and 4.

A further advantage of the present invention is that it provides the possibility of "poka-yoke" checks of subassemblies prior to final assembly. This pre-testing of subassemblies will significantly reduce the need for disassembly and rework of the final modules at the end of the assembly line.

While the best modes for carrying out the invention has been described in detail, those familiar with the art to which this invention relates will recognize various alternative designs and embodiments for practicing the invention within the scope of the appended claims.

What is claimed is:

1. A solenoid-actuated valve assembly with reduced noise, comprising:

a manifold having first, second, third and fourth stepped bores formed therein;

a longitudinally extending solenoid-actuated valve disposed within said stepped bores;

a support bracket secured to the manifold adjacent said first stepped bore;

a rubber retainer disposed between the support bracket and valve for cushioning longitudinal vibrations of the valve for noise reduction; and first, second and third rubber gaskets disposed about said valve and cushioning said valve with respect to said second, third and fourth bores, respectively, for cushioning lateral vibrations of the valve for noise reduction.

2. The valve assembly of claim 1, wherein said manifold comprises a cavity formed in fluid communication with at least one of said bores, said cavity being filled with transmission fluid for substantially submerging said valve for airborne noise abatement.

3. The valve assembly of claim 1, wherein said transmission fluid includes floating debris and said solenoid-actuated valve comprises:

a spool;

a solenoid coil wrapped around the spool;

a movable armature disposed within the spool;

a substantially cylindrical non-magnetic sleeve disposed at least partially within said solenoid coil and having an open end;

a pole piece disposed in said open end of said sleeve; and wherein said sleeve and said pole piece substantially enclose said armature to prevent build-up of debris on the armature.

4. The valve assembly of claim 3, wherein said pole piece includes a body having first and second ends, said first end of said body being disposed partially within said sleeve, said body including an axial channel with first, second and third lateral channels formed in communication with the axial channel and extending laterally to the axial channel, and the assembly further comprises:

an upper seat disposed in the axial channel between said first and second lateral channels;

a lower seat disposed in the axial channel between said second and third lateral channels; and a seat retainer disposed in the axial channel adjacent the third lateral channel.

5. The valve assembly of claim 4, wherein said manifold, seat retainer and second end of said body cooperate to form a vent chamber, said vent chamber being in fluid communication with said first lateral channel whereby to at least partially pressure-balance said body between said first and second ends.

6. The valve assembly of claim 5, further comprising:

a pin connected to said armature;

a movable plunger extending through said upper seat and being engageable with said pin; and a ball disposed within said lower seat for selectively discommunicating said second and third lateral channels, said ball being engageable with said plunger.

7. A solenoid-actuated valve assembly with reduced noise, comprising:

a manifold having a plurality of stepped bores formed therein in communication with each other, said manifold including a cavity formed therein in communication with the bores and including transmission fluid in the cavity, said transmission fluid including floating particles;

a longitudinally extending solenoid-actuated valve disposed within stepped bores, said valve comprising an armature and a non-magnetic sleeve substantially surrounding the armature for preventing said floating particles from attaching to the armature;

a support bracket secured to the manifold adjacent said stepped bores;

a rubber retainer disposed between the support bracket and valve for cushioning longitudinal vibrations of the valve for noise reduction; and a plurality of rubber gaskets disposed about said valve and abutting the sidewalls of said plurality of bores for cushioning lateral vibrations of the valve for noise reduction.

8. The valve assembly of claim 7, wherein said valve is substantially submerged in said transmission fluid for airborne noise abatement.

9. The valve assembly of claim 8, further comprising:

a pole piece body having first and second ends, said first end of said body being disposed partially within said sleeve, said body including an axial channel with first, second and third lateral channels formed in communication with the axial channel and extending laterally to the axial channel, and the assembly further comprises:

an upper seat disposed in the axial channel between said first and second lateral channels;

a lower seat disposed in the axial channel between said second and third lateral channels; and a seat retainer disposed in the axial channel adjacent the third lateral channel.

10. The valve assembly of claim 9, wherein said manifold, seat retainer and second end of said body cooperate to form a vent chamber, said vent chamber being in fluid communication with said first lateral channel whereby to at least partially pressure-balance said body between said first and second ends.

11. A solenoid-actuated valve assembly with reduced noise, comprising:

a manifold having first, second, third and fourth stepped bores formed therein in communication with each other, said manifold further including a cavity formed therein in communication with the bores and including transmission fluid in the cavity, said transmission fluid including floating particles;

a longitudinally extending solenoid-actuated valve disposed within said stepped bores, said valve comprising an armature and a non-magnetic sleeve substantially surrounding the armature for preventing said floating particles from attaching to the armature;

a support bracket secured to the manifold adjacent said stepped bores;

a rubber retainer disposed between the support bracket and valve for cushioning longitudinal vibrations of the valve for noise reduction;

a plurality of rubber gaskets disposed about said valve and abutting the sidewalls of said bores for cushioning lateral vibrations of the valve for noise reduction; and wherein said valve is substantially submerged in said transmission fluid for airborne noise abatement.

12. The valve assembly of claim 11, further comprising:

a pole piece body having first and second ends, said first end of said body being disposed partially within said bore, said body including an axial channel with first, second and third lateral channels formed in communication with the axial channel and extending laterally to the axial channel, and the assembly further comprises:

an upper seat disposed in the axial channel between said first and second lateral channels;

a lower seat disposed in the axial channel between said second and third lateral channels; and a seat retainer disposed in the axial channel adjacent the third lateral channel.

13. The valve assembly of claim 12, wherein said manifold, seat retainer and second end of said body cooperate to form a vent chamber, said vent chamber being in fluid communication with said first lateral channel whereby to at least partially pressure-balance said body between said first and second ends.

* * * * *

Disclaimer

5,651,391 — John Connolly, Rock Falls; Terry Forbes, Dixon; and Dan Stoddard, Amboy, all of Ill. THREE-WAY SOLENOID VALVE. Patent dated July 29, 1997. Disclaimer filed September 01, 2006, by Assignee, Borg-Warner Automotive, Inc., Sterling Heights, Mich.

Hereby enters this disclaimer to claim 1, of said patent.

*(Official Gazette, May 29, 2007)*